B. J. ASHLEY.
EXCRETA VAULT.
APPLICATION FILED OCT. 2, 1911.
1,105,237.
Patented July 28, 1914.
2 SHEETS—SHEET 1.
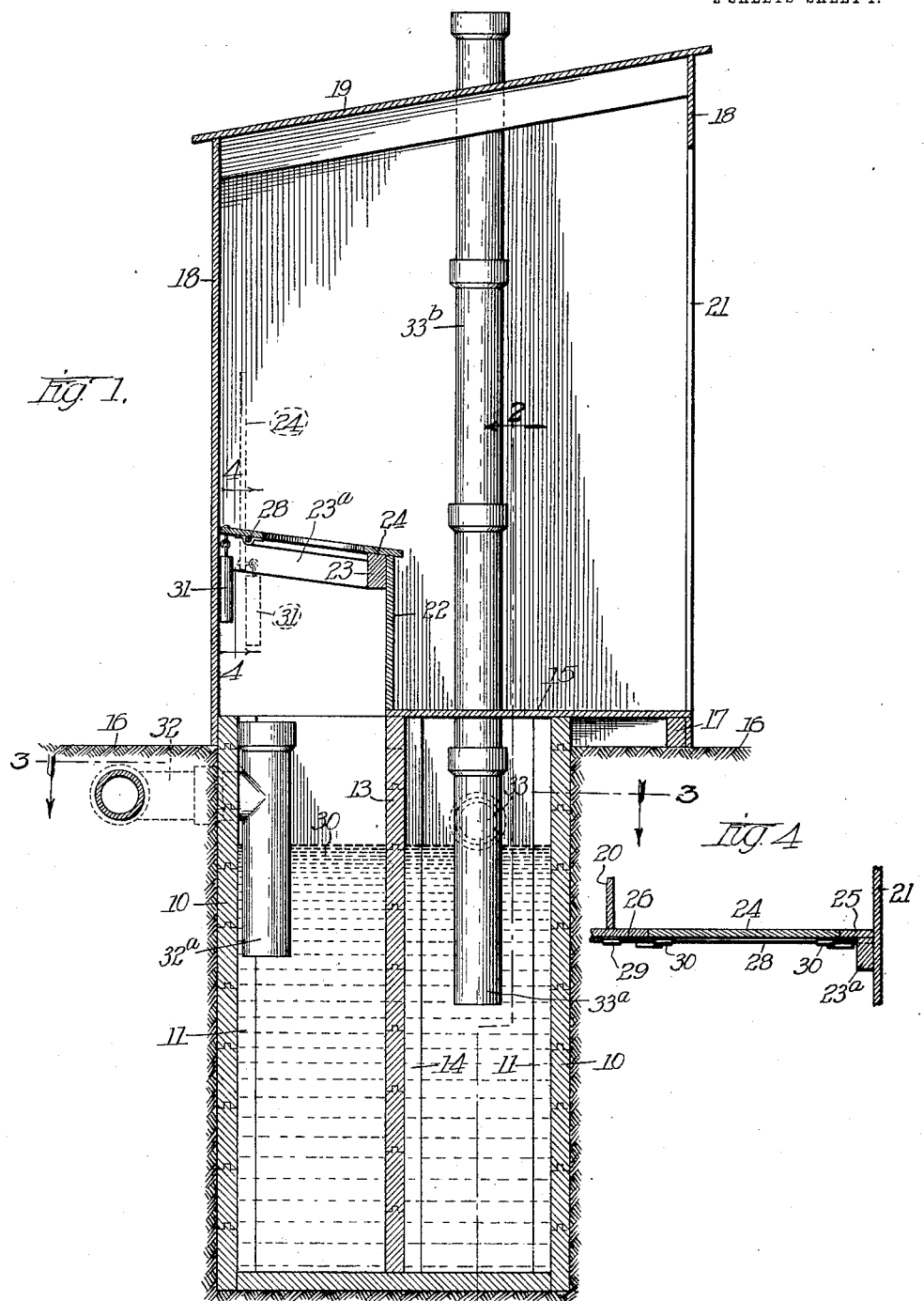

B. J. ASHLEY.
EXCRETA VAULT.
APPLICATION FILED OCT. 2, 1911.
1,105,237.
Patented July 28, 1914.
2 SHEETS—SHEET 2.
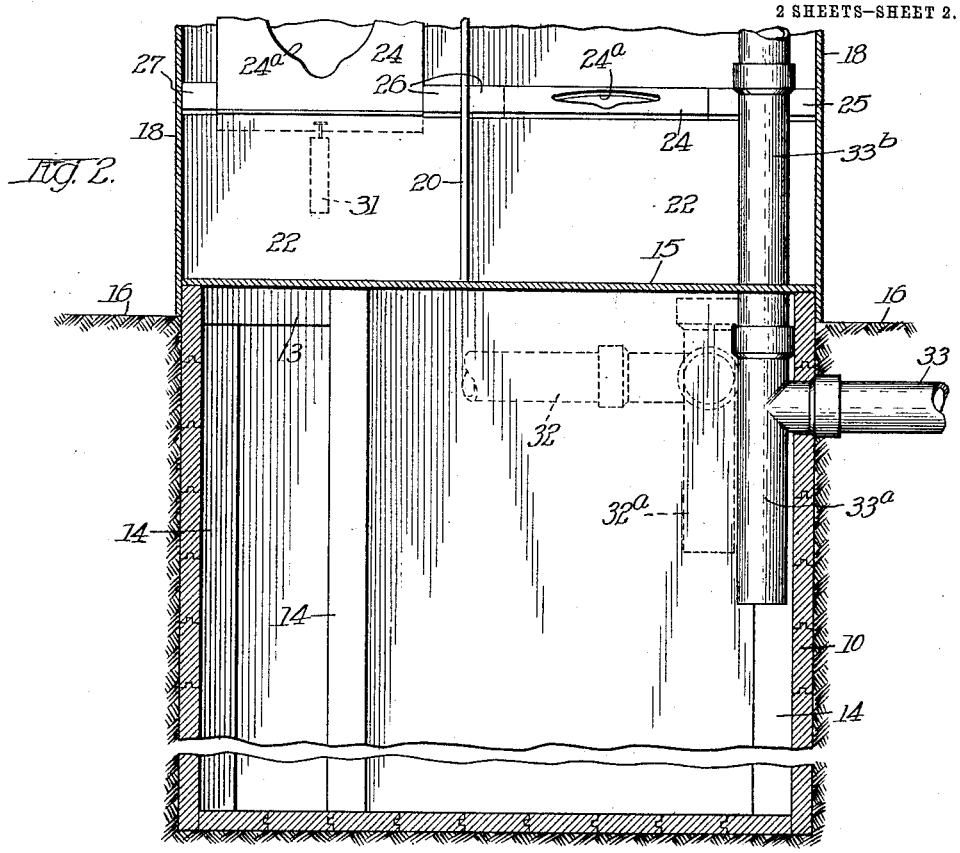
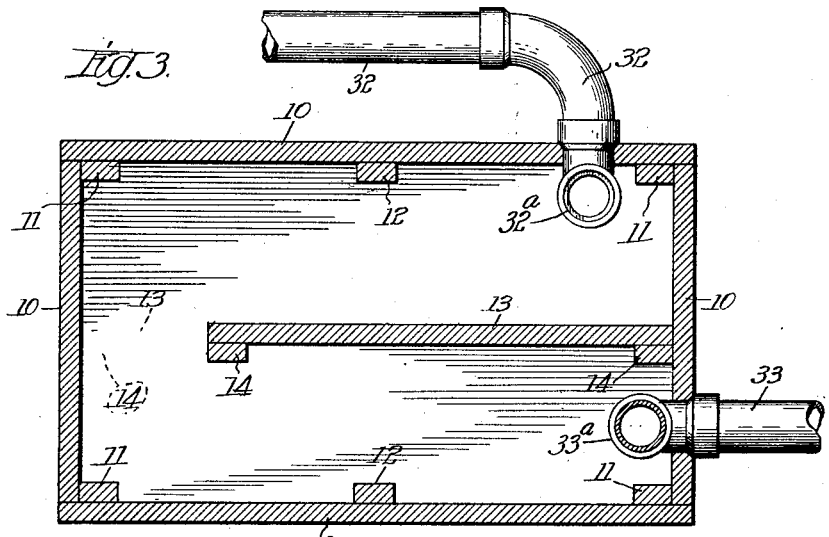

UNITED STATES PATENT OFFICE.

BURTON J. ASHLEY, OF CHICAGO, ILLINOIS.

EXCRETA-VAULT.

1,105,237. Specification of Letters Patent. Patented July 28, 1914.

Application filed October 2, 1911. Serial No. 652,426.

*To all whom it may concern:*

Be it known that I, BURTON J. ASHLEY, a citizen of the United States, residing at Chicago, in the county of Cook and State of Illinois, have invented certain new and useful Improvements in Excreta-Vaults, of which the following is a full, clear, and exact specification.

The invention relates to excreta vaults and houses therefor commonly called privy houses adapted to receive and care for excreta or other forms of sewage.

The object of the invention is to provide a simple, cheap and efficient plant to care for excreta or other forms of sewage in a scientific and healthful manner on a small scale under conditions particularly where large and expensive plants for nitrifying and disposing of excreta and other forms of sewage are not practicable or possible.

Other objects of the invention will appear from the following specification, in which I describe in deail the method best known to me of practising the invention, the same being shown in the accompanying drawings and pointed out more particularly in the appended claims.

In the said drawings Figure 1 is a vertical sectional view through a house and accompanying vault embodying the invention. Fig. 2 is also a vertical sectional view at right angles to the view of Fig. 1, being on the line 2—2 of Fig. 1. Fig. 3 is a horizontal sectional view through the upper part of the vault on the broken line 3—3 of Fig. 1. Fig. 4 is a detail sectional view on the line 4—4 of Fig. 1.

The vault proper is preferably prepared by opening the earth in the manner indicated in Figs. 1 and 2, such opening being determined of course by the desired size of the plant to be constructed, which will depend upon the service required of the same. In the embodiment of the invention shown, the house portion is provided with two separated compartments and the opening in the earth consequently of a length of substantially the same as the width of the house extending beneath the same laterally, and extending from the front to rear a distance somewhat less than the front to rear measurements of the house portion. The depth of the excavation and of the vault proper may vary also according to conditions of service, the proportions of the vault being shown in this embodiment as the most desirable proportions known to me. The walls of the vault may be made of any suitable and cheap material such as stone, brick or concrete, but in the present embodiment since one of the desirable features of the invention is to provide a plant of the character described which may be constructed as cheaply and simply as possible, the walls of the vault are lined with boards, indicated by the reference character 10, the same being preferably provided with corresponding tongues and grooves in order to render the vault as nearly watertight as possible. The wooden walls of the vault may be strengthened by suitable vertical corner pieces as indicated at 11, and intermediate vertical supports as indicated at 12, the number of such depending upon the size of the vault. Within the vault and extending longitudinally thereof I find it desirable to construct a partition or baffle wall indicated at 13, which partially divides the vault longitudinally on its interior, the baffle wall extending preferably from the bottom of the vault to the extreme upper side on a level with the side walls and forming a support for the rearmost extremity of the floor of the vault house, the floor being indicated at 15, and the baffle wall 13 being formed preferably of boards like the outer walls of the vault and held together by vertically extending supports 14.

The walls 10 of the vault as well as the baffle wall 13 extend a short distance above the surface of the surrounding earth, which is indicated by the reference character 16, and support the floor 15 of the house, which may have a further support as the sill 17 on the top of the earth or on suitable supporting material where it is possible and convenient to obtain such. The floor 15 is preferably constructed of boards in the usual manner, terminating over the baffle wall. In order to support the rear of the floor 15 where the baffle 13 is terminated, the upper member of the wall 13 may be extended to the end of the vault and secured to that side of the wall. It is one of the special objects of the invention to construct a vault house as well as a vault of materials which may be cheaply obtained and convenient of access in locations remote particularly from cities and towns where sewage disposal may be taken care of on a community scale, and the vault house preferably is shown also of a cheap wooden construction, the four outer walls suitably secured at the bottom around one side and the two ends of the walls of the vault preferably by nailing or otherwise securing the boards forming the vertical walls to the rear and sides 10 of the vault. At the front the walls of the house, all of which are indicated by the reference character 18, are nailed at the bottom to the front sill 17, and all the walls are connected and covered by a roof 19 of any desired material, preferably having the usual roof slant as indicated. Within the vault house partition 20 is shown dividing the same into two closed compartments, each of which are accessible through openings or doors 21 in the outer front wall 18 of the house. The floor 15 terminating as described immediately over the baffle wall 13, leaves an opening over the top of the rear portion of the vault, which is closed by a raised covering usually constructed of wood, the front of which wall as indicated by the reference character 22 rises from the floor 15 immediately over the baffle wall 13, and preferably extends entirely from side to side of the vault house through both the compartments as illustrated in the present embodiment of the invention. The wall 22 may be of boards or other desired material and when constructed of wood as preferred the top sill 23 is extended to the top of the wall 22 from end to end of the house and suitably secured to the walls thereof. The member 23 may be extended as indicated at 23$^a$ along the ends of the building to furnish side supports for the covering over the open portion of the vault. The front wall 22 as described is intended as a part of a seat or seats over the open portion of the vault and the top of the same is covered completely except for the usual openings indicated at 24$^a$ in the hinged cover members 24. At each end of the cover members 24 there are stationary covered portions as indicated at 25, 26 and 27. In order to keep the hinged seat members 24 in a sanitary condition at all times it is very desirable that they be arranged to fold about a vertical position when not in use, and to accomplish this purpose I provide a metallic rod as indicated at 28 of suitable size and strength, which extends from end to end of the house beneath the top cover of the seat portion of the vault and beneath the hinged seat portions 24, this rod being supported by passing through holes through the end cleats 23$^a$ and through the end walls of the house, if desired. It may be further strengthened by suitable means secured to the stationary top pieces 25, 26 and 27 as shown, such strengthening members being indicated by the reference character 29, and consisting of suitable metallic loops secured by nails, screws or other desired means to the top cover of the seat. The seat members 24 are hinged to rod 28 by suitable metallic loops similar to the loops 29, such construction permitting the seat members 24 to swing to the position indicated in dotted lines in Fig. 1, the seat being counterbalanced by a weight 31, preferably pivotally connected as illustrated, the portion of the seat member 24 extending rearward of pivotal support 28 so that the seat will normally under the influence of counterbalance 31 stand in the vertical position as indicated in dotted lines in Fig. 1. For use in small plants as described this is an important feature of the improvements described herein, as it keeps the seat member at all times in a position where it will remain clean and sanitary unless desired for use.

In a small plant of the character described where a bacterial vault is provided I find it desirable to provide means for cleaning and flushing the vault with an abundance of water, which may be obtained from any desired source, as from the roofs of adjoining buildings. Near the top of the vault wall and through the rear wall thereof an inlet pipe 32 is passed, terminating in a downwardly extending branch 32$^a$ adapted to discharge into the tank into the vault below the normal level of the materials therein, which materials consisting of excrement, sewage or sewage and water, is indicated by the reference character 30. In the other compartment of the vault on the opposite side of the baffle wall a pipe similar to the inlet pipe is provided, the same piercing the end wall of the vault and being indicated by the reference character 33. On the inside of the vault the pipe 33 has a downwardly extending branch as indicated at 33$^a$, and the pipe 33 is passed through the wall of the vault on a plane somewhat below the plane of the inlet pipe 32 in order that when the level of the materials within the vault as in flushing reaches the top side of the vault adjacent the inlet and discharge pipes an outlet for the same will be provided through pipe 33 before there is a back-flow through inlet pipe 32. For carrying off noxious vapors and affording an outward passage or vent the discharge pipe 33 may be provided with an upwardly extending branch as indicated at 33$^b$, which extends through the roof 19 venting on the outside of the building.

The manner of accumulation of the excreta within the vault will be apparent from the foregoing description. The inlet pipe 32 which may be connected with a tank or pump or with the gutters of adjacent buildings, furnishes a ready means for conveying large quantities of water to the vault for the purpose of flushing, which takes place at will or whenever rain is shed in sufficient quantities from such buildings. In a vault of the described character the action of anaërobic bacteria upon the materials within the closed vault is very marked and the decomposition of the bacteria and purification of the same is expedited by the admission of water, rapidly reducing the masses of material within the vault to a fluid, the more solid particles remaining near the top in the form of a mat or settle to the bottom and leaving between the top and bottom a liquid zone which I call the zone of greatest fluidity. On account of the outlet pipe 33ª being depressed as indicated, the materials which have been most thoroughly liquefied within the vault will be the first to be discharged when the flushing operation of the vault takes place, and such materials as pass from the vault through the discharge pipe 33 are therefore in condition for the action of aërobic bacteria if it is desired to flush such fluid from the vault and allow it to pass at once into an open or closed drain or upon the surface of waste land. If desired, however, the outlet pipe 33 may be connected with underground pipes, as tile drain, buried beneath the earth and surrounded with suitable aerating materials as cinders, clinkers, crushed stone and the like, where aërobic action beneath the surface of the soil may further act upon the fluid materials discharged or flushed from the vault, purifying the same and counteracting the effects of poisonous or noxious materials that may pass from the sewage thus treated.

From the above description it will be seen that the entire plant is constructed with the simplest materials obtainable in all parts of the country and that the construction of the plant is a comparatively simple matter, while the plant at the same time insures the handling of the excreta and sewage in the most approved and sanitary manner, eliminating odor and the danger of the escape of poisons from the vault which may pollute the source of water supply and in other ways breed disease.

In order that the invention might be fully understood the details of the preferred embodiment have been shown and described, but it is not desired to be limited to these exact details for it will be apparent that those skilled in the art may embody the invention in many forms differing in certain details without departing from the purpose and spirit of the invention. For example, the flush may be down spout water as suggested, the overflow from a cistern or spring, water from a watermain, the wash from a yard, or any form of fresh, soft or hard water.

The outlet should be submerged within the vault as shown, below the surface of the liquid line, to take the liquids from the vault from the zone of greatest fluidity which is usually a short distance below the top of the mass within the vault, but sufficiently below the top to prevent the breaking of the mat on the top or the discharge of floating excreta or paper. While the inlet is preferably submerged as shown and described it is not so necessary that it shall be submerged as that the outlet shall be submerged.

While the shape of the vault is preferably as shown and provided with a baffle wall, I have found by experiment that the baffle wall may be omitted when the vault is of such length or size and inlet and outlet pipes separated sufficiently so that the entire fluid contents of the vault will move toward the outlet without causing too much of mixing of old stale fluids with the incoming fresh water.

The aim of the invention is to so arrange the devices as described in order to provide fresh water from any convenient source which will supply sufficient oxygen to cause the solids to break down into fluids and gases, and to prevent the arising of odors in consequence of the want of oxygen, which odors always occur in putrefactive masses when oxygen in the water is all consumed. It is the absence of oxygen that causes bad odors to be produced under such conditions.

I claim:

1. The combination with an excreta vault below the surface of the soil, said vault being open and provided with a house covering over the top thereof, a baffle wall dividing the vault into two communicating divisions, an inlet pipe connected with a suitable source of water supply and emptying into one of said divisions within the vault which said division is adapted to receive the incoming excreta, an outlet pipe below the level of said inlet pipe and leading from the other of said communicating divisions of the vault to which the excreta is admitted only as it passes around the baffle wall, a floor portion for one of said divisions and an elevated seat covering said other division, said floor and seat being commonly supported in part by said baffle-wall.

2. The combination of an excreta vault adapted for burial in the soil and for maintaining a body of liquid, an inlet pipe for flushing water entering said vault above the liquid level and turning downwardly below the liquid level, an upwardly extending pipe leading from said vault for maintaining the level of the liquid therein and having a downwardly extending portion below said liquid level, a vertical baffle-wall dividing said vault into communicating inlet and outlet compartments with which said inlet and outlet pipes respectively communicate, a floor portion covering said outlet compartment and an elevated seat covering and communicating directly with said inlet compartment, the floor and seat being commonly supported in part by said baffle-wall, and a vent pipe communicating with said outlet pipe above the liquid level.

In testimony whereof I have signed my name to this specification, in the presence of two subscribing witnesses, on this 29th day of September, A. D. 1911.

BURTON J. ASHLEY.

Witnesses:
ARTHUR L. SPRINKLE,
C. H. SEEM.

Copies of this patent may be obtained for five cents each, by addressing the "Commissioner of Patents, Washington, D. C."